United States Patent
Igawa

(10) Patent No.: US 10,512,016 B2
(45) Date of Patent: Dec. 17, 2019

(54) RADIO COMMUNICATION APPARATUS, RADIO COMMUNICATION SYSTEM, CONNECTION MANAGEMENT METHOD, AND NON-TRANSITORY COMPUTER READABLE MEDIUM

(71) Applicant: NEC Platforms, Ltd., Kawasaki-shi, Kanagawa (JP)

(72) Inventor: Masaya Igawa, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 0 days.

(21) Appl. No.: 15/758,393

(22) PCT Filed: Mar. 28, 2016

(86) PCT No.: PCT/JP2016/001787
§ 371 (c)(1),
(2) Date: Mar. 8, 2018

(87) PCT Pub. No.: WO2017/051488
PCT Pub. Date: Mar. 30, 2017

(65) Prior Publication Data
US 2018/0262964 A1    Sep. 13, 2018

(30) Foreign Application Priority Data

Sep. 25, 2015  (JP) ................. 2015-187694

(51) Int. Cl.
*H04W 4/00* (2018.01)
*H04W 36/30* (2009.01)
(Continued)

(52) U.S. Cl.
CPC ........... *H04W 36/30* (2013.01); *H04W 24/04* (2013.01); *H04W 36/38* (2013.01); *H04W 48/20* (2013.01);
(Continued)

(58) Field of Classification Search
CPC ...... H04W 48/20; H04W 36/30; H04W 76/30
See application file for complete search history.

(56) References Cited

FOREIGN PATENT DOCUMENTS

| JP | 2013-145433 A | 7/2013 |
| JP | 2014-123997 A | 7/2014 |

(Continued)

OTHER PUBLICATIONS

International Search Report for PCT Application No. PCT/JP2016/001787, dated May 17, 2016.

*Primary Examiner* — Bo Hui A Zhu

(57) ABSTRACT

A radio communication apparatus (10) according to the present disclosure includes: a communication unit (11) connected to at least one radio terminal (20) via wireless LAN; a communication unit (12) connected to a radio communication apparatus (30) including a sensor via wireless LAN and receiving a result of a detection in the sensor indicating that a person is approaching from the radio communication apparatus (30); a monitoring unit (13) for monitoring a radio wave condition between the communication unit (11) and the at least one radio terminal (22) to which the communication unit (11) is connected via wireless LAN; and a connection control unit (14) for canceling, when the result of the detection is received, wireless LAN connection with a radio terminal in which the radio wave condition is lower than a predetermined quality.

10 Claims, 7 Drawing Sheets

(51) Int. Cl.
*H04W 76/30* (2018.01)
*H04W 36/38* (2009.01)
*H04W 24/04* (2009.01)
*H04W 48/20* (2009.01)
*H04W 84/12* (2009.01)

(52) U.S. Cl.
CPC .......... *H04W 76/30* (2018.02); *H04W 36/305* (2018.08); *H04W 84/12* (2013.01)

(56) References Cited

FOREIGN PATENT DOCUMENTS

| | | |
|---|---|---|
| JP | 2014-236357 A | 12/2014 |
| WO | 2010/110426 A1 | 9/2010 |

Fig. 5

| NAME OF DEVICE | MAC ADDRESS | WHETHER DEVICE WILL BE TARGET WHOSE WIRELESS LAN CONNECTION SHOULD BE DISCONNECTED |
|---|---|---|
| RELAY APPARATUS 50 | AA:BB:CC:DD:EE | NO |
| RADIO TERMINAL 22 | AA:BB:CC:DD:FF | YES |
| RADIO TERMINAL 23 | AA:BB:CC:DD:GG | YES |
| ... | ... | ... |

Fig. 7

| NAME OF DEVICE | RSSI (t=0) | RSSI (t=5) | RSSI (t=10) | RSSI (t=15) | RSSI (t=20) |
|---|---|---|---|---|---|
| RADIO TERMINAL 22 | 50 | 30 | 10 | 8 | 5 |
| RADIO TERMINAL 23 | 35 | 35 | 30 | 33 | 35 |
| RADIO TERMINAL 24 | 15 | 15 | 15 | 16 | 14 |
| ... | ... | ... | ... | ... | ... |

RADIO COMMUNICATION APPARATUS, RADIO COMMUNICATION SYSTEM, CONNECTION MANAGEMENT METHOD, AND NON-TRANSITORY COMPUTER READABLE MEDIUM

This application is a National Stage Entry of PCT/JP2016/001787 filed on Mar. 28, 2016, which claims priority from Japanese Patent Application 2015-187694 filed on Sep. 25, 2015, the contents of all of which are incorporated herein by reference, in their entirety.

TECHNICAL FIELD

The present disclosure relates to a radio communication apparatus, a radio communication system, a connection management method, and a program, and specifically relates to a radio communication apparatus that performs wireless LAN communication, a radio communication system, a connection management method, and a program.

BACKGROUND ART

In recent years, smartphones and tablet terminals have spread rapidly. In general, in mobile communication using radio terminals such as smartphones, the capacity of data that can be communicated is defined in advance. When the data capacity has exceeded the predetermined data capacity, the communication rate of the radio terminal is limited so that the radio terminal cannot perform high-speed communication any longer or the radio terminal cannot perform mobile communication any longer. Therefore, when radio communication is performed using radio terminals at home, wireless LAN communication, in which data capacity is not limited, is typically performed.

Further, when a wireless Local Area Network (LAN) communication environment is constructed at home, a relay apparatus may be installed in addition to an access point for the purpose of enlarging the wireless LAN communication area and improving the radio environment. The access point may be referred to as a master device. Further, the radio terminal may be referred to as a slave device. The relay apparatus relays wireless LAN communication between the radio terminal and the access point.

Patent Literature 1 discloses a configuration of a wireless LAN communication system in which a relay apparatus is installed. Specifically, Patent Literature 1 discloses that the relay apparatus uses a Service Set Identifier (SSID) the same as that of the master device. Accordingly, even in a case in which information regarding the relay apparatus has not been configured in the radio terminal in advance, the radio terminal can be easily connected to the relay apparatus by radio.

CITATION LIST

Patent Literature

[Patent Literature 1] Japanese Unexamined Patent Application Publication No. 2014-123997

SUMMARY OF INVENTION

Technical Problem

In general, when the radio terminal is once connected to or belongs to one of the access point and the relay apparatus, the connection destination cannot be changed until the time the connection with the access point or the relay apparatus to which the radio terminal is connected is disconnected. Assume a case, for example, in which the radio terminal is connected to the access point in an environment in which the access point and the relay apparatus are arranged at home. In this case, even when a user who holds the radio terminal comes close to the relay apparatus and the strength of radio waves of the relay apparatus becomes larger than the strength of radio waves of the access point for the radio terminal, the connection destination of the radio terminal is not changed. That is, even when the strength of radio waves becomes weaker, the radio terminal continues to be connected to the access point that the radio terminal has been connected to first.

Accordingly, even when a relay apparatus is introduced at home in order to improve the radio environment, there is a problem that the connection of the radio terminal cannot be freely changed to an access point or a relay apparatus in which the strength of radio waves is high.

One object of the present disclosure is to provide a radio communication apparatus, a radio communication system, a connection management method, and a program capable of allowing a radio terminal to change connection destinations to a radio communication apparatus in which the radio environment is good.

Solution to Problem

A radio communication apparatus according to a first aspect of the present disclosure includes: a first communication unit configured to be connected to at least one radio terminal via wireless LAN; a second communication unit configured to be connected to another radio communication apparatus including a sensor via wireless LAN and receiving a result of a detection in the sensor indicating that a person is approaching from the other radio communication apparatus; a monitoring unit configured to monitor a radio wave condition between the first communication unit and the at least one radio terminal to which the first communication unit is connected via wireless LAN; and a connection control unit configured to cancel, when the result of the detection is received, wireless LAN connection with a radio terminal in which the radio wave condition is lower than a predetermined quality.

A radio communication system according to a second aspect of the present disclosure includes: a radio terminal configured to perform wireless LAN communication; a first radio communication apparatus connected to the at least one radio terminal via wireless LAN; and a second radio communication apparatus that is connected to the first radio communication apparatus via wireless LAN and includes a sensor that detects that a person is approaching, in which the second radio communication apparatus transmits the result of the detection to the first radio communication apparatus when the sensor detects that a person is approaching, the first radio communication apparatus cancels wireless LAN connection with a radio terminal in which a radio wave condition is poorer than a predetermined quality when it receives the result of the detection, and the radio terminal whose wireless LAN connection has been canceled is connected to one of the first radio communication apparatus and the second radio communication apparatus in which the radio wave condition is higher via wireless LAN.

A connection management method according to a third aspect of the present disclosure includes: connecting to at least one radio terminal via wireless LAN; receiving, from another radio communication apparatus including a sensor and performing wireless LAN connection, a result of a detection in the sensor indicating that a person is approaching; monitoring a radio wave condition in the connection with the at least one radio terminal that is performing wireless LAN connection; and canceling, when the result of the detection is received, wireless LAN connection with a radio terminal in which the radio wave condition is lower than a predetermined quality.

A program according to a fourth aspect of the present disclosure causes a computer to execute the following processing of: connecting to at least one radio terminal via wireless LAN; receiving, from another radio communication apparatus including a sensor and performing wireless LAN connection, a result of a detection in the sensor indicating that a person is approaching; monitoring a radio wave condition in the connection with the at least one radio terminal that is performing wireless LAN connection; and canceling, when the result of the detection is received, wireless LAN connection with a radio terminal in which the radio wave condition is lower than a predetermined quality.

Advantageous Effects of Invention

According to the present disclosure, it is possible to provide a radio communication apparatus, a radio communication system, a connection management method, and a program capable of allowing a radio terminal to change connection destinations to a radio communication apparatus in which the radio environment is good.

BRIEF DESCRIPTION OF DRAWINGS

FIG. 5 is a diagram in which a MAC address and information regarding whether each of devices will be the target whose wireless LAN connection should be disconnected are associated with each other according to a third embodiment;

FIG. 7 is a diagram showing the transition of the strength of radio waves for each radio terminal recorded by an access point according to the fourth embodiment.

DESCRIPTION OF EMBODIMENTS

First Embodiment

Figure 1:
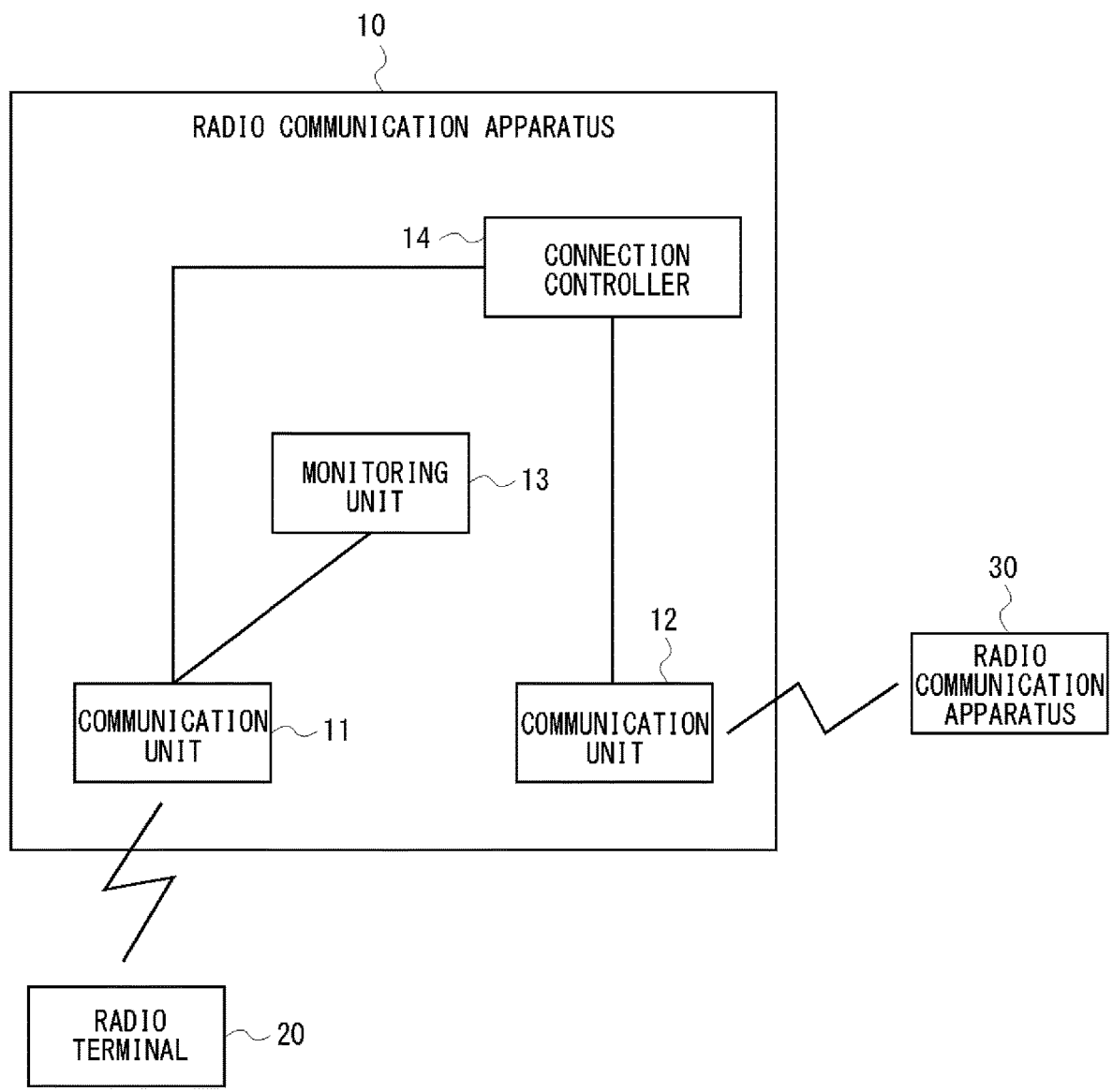
FIG. 1 is a configuration diagram of a radio communication apparatus according to a first embodiment.

Hereinafter, with reference to the drawings, embodiments of the present disclosure will be explained. First, with reference to FIG. 1, a configuration example of a radio communication apparatus 10 according to a first embodiment will be explained. The radio communication apparatus 10 may be a computer apparatus that is operated by a processor executing a program stored in a memory. The radio communication apparatus 10 may be, for example, an access point that performs wireless LAN communication.

Alternatively, the radio communication apparatus 10 may be a relay apparatus configured to relay communication between an access point and a radio terminal that performs wireless LAN communication.

The radio communication apparatus 10 includes a communication unit 11, a communication unit 12, a monitoring unit 13, and a connection controller 14. The components that constitute the radio communication apparatus 10 may be software or modules operated by a processor executing a program stored in a memory. Alternatively, the components that constitute the radio communication apparatus 10 may be hardware such as circuits or chips.

The communication unit 11 communicates with at least one radio terminal 20 via wireless LAN. The radio terminal 20 is a computer apparatus capable of performing wireless LAN communication. The radio terminal 20 may be, for example, a mobile telephone terminal, a smartphone, or a tablet terminal. The communication unit 11 may communicate with one radio terminal 20 via wireless LAN or may communicate with two or more radio terminals via wireless LAN.

The state in which the wireless LAN connection is being performed is, for example, a state in which the communication unit 11 and the radio terminal 20 can communicate with each other via wireless LAN. That is, the state in which the wireless LAN connection is being performed may be a state in which a radio communication line used for the wireless LAN communication is established between the communication unit 11 and the radio terminal 20. Further, instead of saying that the communication unit 11 is connected to the radio terminal 20 via wireless LAN, it can be said that the radio terminal 20 belongs to the communication unit 11.

The communication unit 12 is connected to a radio communication apparatus 30 including a sensor via wireless LAN. Further, the communication unit 12 receives a result of a detection in the sensor indicating that a person is approaching from the radio communication apparatus 30. Each of the communication unit 11 and the communication unit 12 performs wireless LAN communication conforming to the IEEE (The Institute of Electrical and Electronics Engineers) 802.11 standards and may use a frequency band of either 2.4 GHz or 5 GHz.

When, for example, the radio communication apparatus 10 is used as an access point, the radio communication apparatus 30 is used as a relay apparatus. Further, when the radio communication apparatus 10 is used as a relay apparatus, the radio communication apparatus 30 is used as an access point.

When the radio communication apparatus 30 detects by the sensor that a person is approaching, the radio communication apparatus 30 transmits the result of the detection to the communication unit 12 via the wireless LAN communication.

The monitoring unit 13 monitors the radio wave condition between the communication unit 11 and at least one radio terminal 20 that is connected to the communication unit 11 via wireless LAN. The monitoring unit 13 may monitor, for example, the strength of radio waves, throughput, a transmission delay or the like as the radio wave condition.

The connection controller 14 cancels, when it receives the result of the detection transmitted from the radio communication apparatus 30, the wireless LAN connection with the radio terminal 20 in which the radio wave condition is poorer than a predetermined quality. That the radio wave condition is poorer than the predetermined quality may mean, for example, that the strength of radio waves is smaller than a predetermined value, that throughput is lower than a predetermined value, or that a transmission delay is larger than a predetermined value.

That the wireless LAN connection with the radio terminal 20 is canceled may mean that the radio terminal 20 no longer belongs to the communication unit 11. When the wireless LAN connection with the communication unit 11 has been canceled, the radio terminal 20 searches for an access point and a relay apparatus that are present near the radio terminal 20. The radio terminal 20 is connected to, for example, a radio communication apparatus such as an access point or a relay apparatus in which the strength of radio waves is the highest via wireless LAN as a result of the search. It is assumed that the radio terminal 20 holds a radio profile to connect to the radio communication apparatus 10 and the radio communication apparatus 30 via wireless LAN. The radio profile is, for example, an SSID, an encryption key or the like of the access point or the relay apparatus. The radio terminal 20 is able to be autonomously connected to the radio communication apparatus 10 and the radio communication apparatus 30 via wireless LAN since it has the radio profile to be connected to the radio communication apparatus 10 and the radio communication apparatus 30 via wireless LAN.

As described above, by using the radio communication apparatus 10 in FIG. 1, the radio communication apparatus 10 is able to cancel the connection with the radio terminal 20 in which the radio wave condition has degraded. Accordingly, the radio terminal 20 can be connected to another radio communication apparatus in which the radio wave condition is high via wireless LAN without continuing the wireless LAN connection in which the radio wave condition has degraded.

Further, when it has been detected in the radio communication apparatus 30 that a person is approaching and the radio wave condition with the radio terminal 20 is degraded, the radio communication apparatus 10 cancels the wireless LAN connection with the radio terminal 20.

When it has been detected in the radio communication apparatus 30 that a person is approaching and further the radio wave condition between the radio communication apparatus 10 and the radio terminal 20 has degraded, it is assumed that the user who holds the radio terminal 20 has moved away from the radio communication apparatus 10 and has come close to the radio communication apparatus 30.

That is, when it is assumed that the radio terminal 20 has moved away from the radio communication apparatus 10 and has come close to the radio communication apparatus 30, the radio communication apparatus 10 is able to cancel the wireless LAN connection with the radio terminal 20 to allow the radio terminal 20 to be connected to the radio communication apparatus 30 via wireless LAN. Accordingly, when the radio terminal 20 has moved away from the radio communication apparatus 10 and has come close to the radio communication apparatus 30, the radio terminal 20 is able to change the connection destination of the wireless LAN connection to the radio communication apparatus 30 in which the radio wave condition is high.

Second Embodiment

Figure 2:
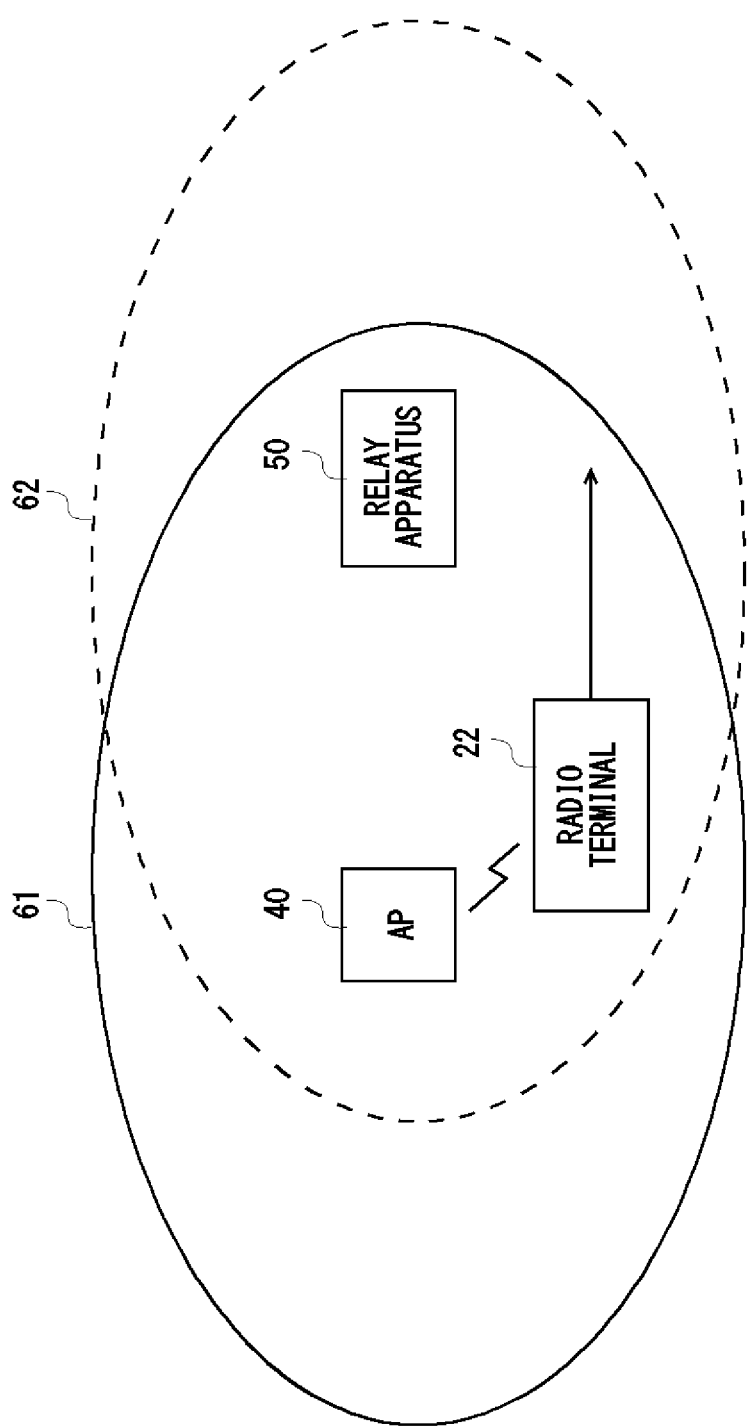
FIG. 2 is a diagram for explaining a wireless LAN communication area according to a second embodiment.

With reference next to FIG. 2, a wireless LAN communication area according to a second embodiment of the present disclosure will be explained. As shown in FIG. 2, an access point (AP) 40 forms a wireless LAN communication area 61. Further, a relay apparatus 50 forms a wireless LAN communication area 62. Further, the access point 40 is located also in the wireless LAN communication area 62. Further, the relay apparatus 50 is located also in the wireless LAN communication area 61. That is, the access point 40 and the relay apparatus 50 are located in an area in which the wireless LAN communication area 61 and the wireless LAN communication area 62 overlap each other.

A radio terminal 22 may be directly connected to the access point 40 via wireless LAN or may be connected to the relay apparatus 50 via wireless LAN and communicate with the access point 40 via the relay apparatus 50.

FIG. 2 shows a state in which the radio terminal 22 is moving in a direction away from the access point 40 and a direction close to the relay apparatus 50 in a state in which the radio terminal 22 is connected to the access point 40 via wireless LAN.

Figure 3:
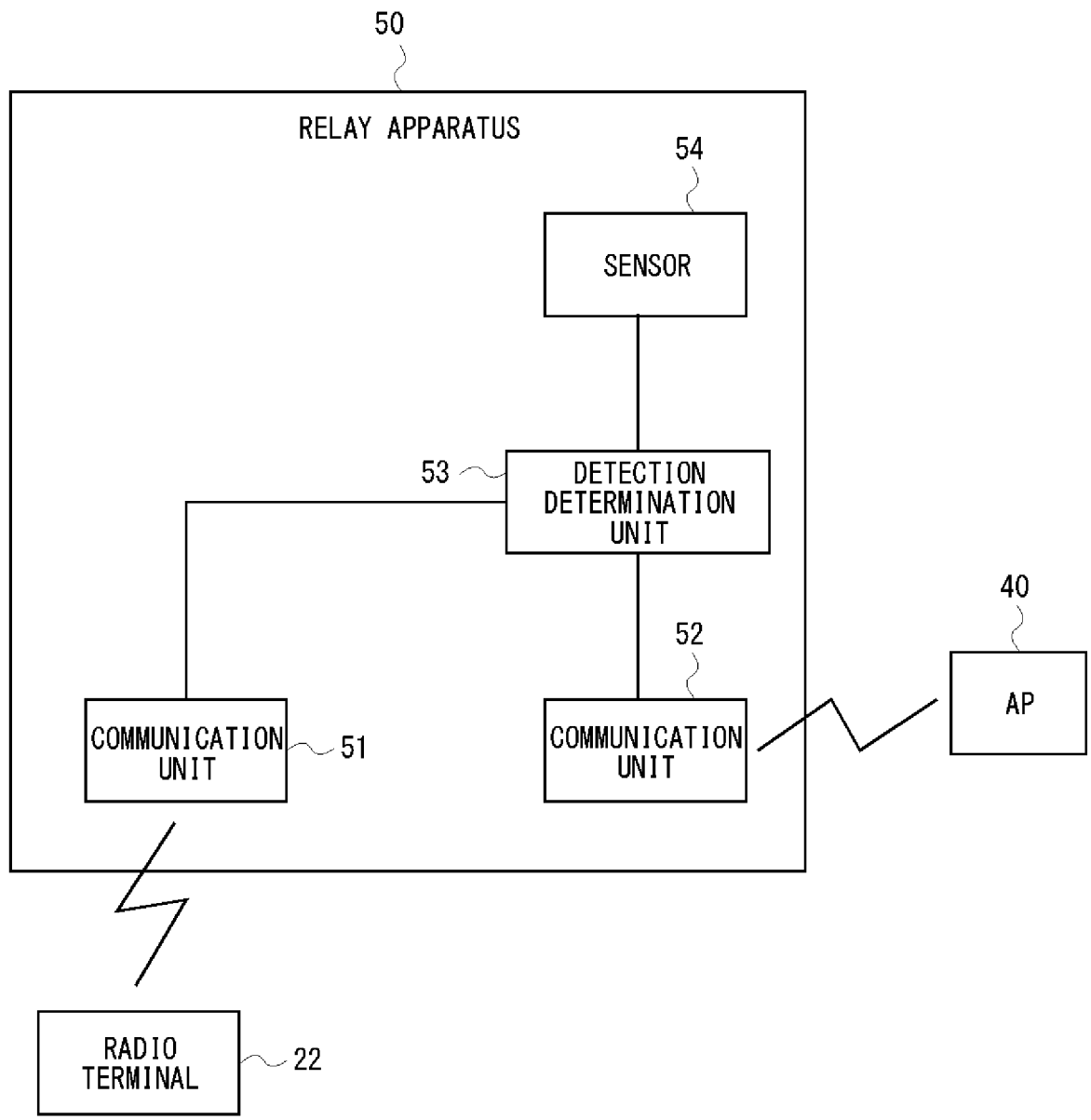
FIG. 3 is a configuration diagram of a relay apparatus according to the second embodiment.

With reference next to FIG. 3, a configuration example of the relay apparatus 50 will be explained. The relay apparatus 50 corresponds to the radio communication apparatus 30 shown in FIG. 1. The access point 40 has a configuration similar to that of the radio communication apparatus 10 shown in FIG. 1.

The relay apparatus 50 includes a communication unit 51, a communication unit 52, a detection determination unit 53, and a sensor 54. The communication unit 51 communicates with the radio terminal 22 located in the wireless LAN communication area 62 via wireless LAN. Further, the communication unit 52 communicates with the access point 40 located in the wireless LAN communication area 62 via wireless LAN.

The sensor 54 detects that there is a person near the relay apparatus 50 or a person is approaching the relay apparatus 50. The sensor 54 outputs the result of the detection to the detection determination unit 53. The sensor 54 may be, for example, a motion sensor, an illuminance sensor or the like.

The motion sensor is a sensor that detects that there is a person near the relay apparatus 50 or a person is approaching the relay apparatus 50 by detecting a change in the temperature near the relay apparatus 50.

The illuminance sensor is a sensor that detects light near the relay apparatus 50. When, for example, the illuminance sensor has detected light since an illumination apparatus that illuminates the relay apparatus 50 has been lit, it can be estimated that a person has manipulated the illumination apparatus that is located near the relay apparatus 50. Accordingly, when the illuminance sensor detects light, it is possible to detect that there is a person near the relay apparatus 50 or a person is approaching the relay apparatus 50.

When the detection determination unit 53 receives the result of the detection output from the sensor 54, it determines that there is a person near the relay apparatus 50 or a person is approaching the relay apparatus 50. The detection determination unit 53 transmits the result of the detection indicating that there is a person near the relay apparatus 50 or a person is approaching the relay apparatus 50 to the access point 40 via the communication unit 52.

Figure 4:
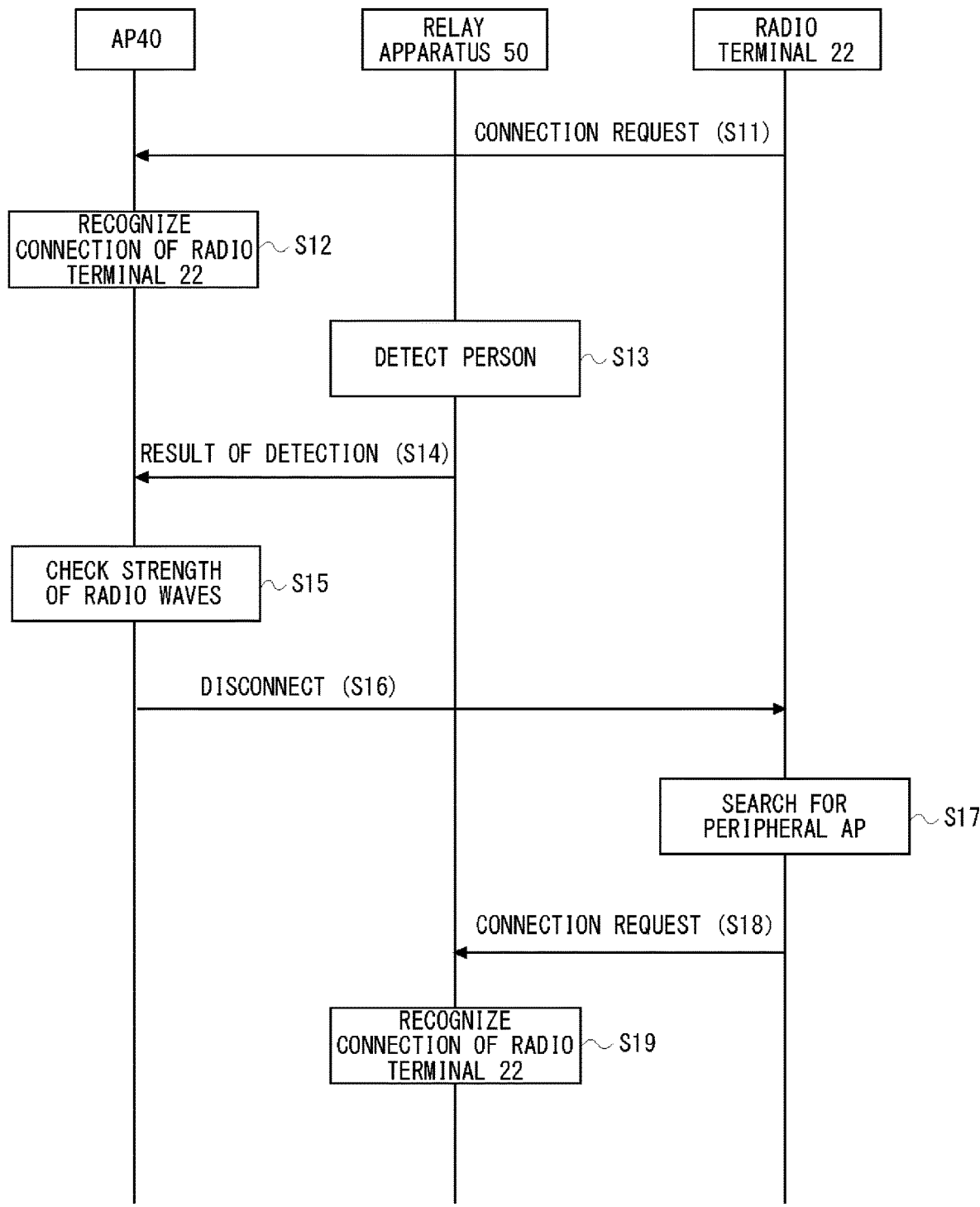
FIG. 4 is a diagram showing a flow of connection control processing in a radio terminal according to the second embodiment.

With reference next to FIG. 4, a flow of connection control processing of the radio terminal 22 according to the second embodiment of the present disclosure will be explained. First, the radio terminal 22 moves into the wireless LAN communication area 61 in a state in which the radio terminal 22 does not perform the wireless LAN communication and transmits a connection request message to connect to the access point 40 via wireless LAN (S11).

Next, the access point 40 recognizes that the radio terminal 22 has connected thereto via wireless LAN or that the radio terminal 22 has belonged thereto (S12). The access point 40 may include, for example, a wireless LAN connection list or the like and add the radio terminal 22 which has connected to the access point 40 via wireless LAN to the wireless LAN connection list. Through Steps S11 and S12, the radio terminal 22 is in a state in which it is connected to the access point 40 via wireless LAN.

Next, the relay apparatus 50 detects that a person is approaching (S13). The relay apparatus 50 detects, for example, that a person is approaching the relay apparatus 50 by using the motion sensor as the sensor 54. Next, the relay apparatus 50 transmits, to the access point 40, the result of the detection indicating that it has detected that a person is approaching (S14).

Next, the access point 40 checks the strength of radio waves that the radio terminal has received for each of radio terminals that are connected thereto via wireless LAN (S15). Only the radio terminal 22 may be connected to the access point 40 by wireless LAN or a plurality of radio terminals including the radio terminal 22 may be connected to the access point 40 by wireless LAN. That the access point 40 checks the strength of radio waves may mean that it checks a Received Signal Strength Indicator (RSSI) value included in packet data transmitted from each of the radio terminals in communication using a protocol defined in the IEEE802.11 standard. The RSSI is a value indicating the strength of the radio waves that each of the radio terminals has received from the access point 40.

In Step S15, the access point 40 compares the RSSI value with a predetermined threshold for all the radio terminals that are connected thereto via wireless LAN. Further, the access point 40 extracts the radio terminal having an RSSI value that is below the threshold. The access point 40 extracts, for example, the radio terminal 22 as the radio terminal having the RSSI value that is below the threshold in Step S15.

Next, the access point 40 transmits a disconnect message to the radio terminal 22 in order to disconnect the wireless LAN connection with the radio terminal 22 (S16). While the access point 40 transmits the disconnect message to only the radio terminal 22 in FIG. 4, the access point 40 transmits the disconnect message to a plurality of radio terminals when it has extracted a plurality of radio terminals including the RSSI values that are below the threshold. When the radio terminal 22 receives the disconnect message in Step S16, the wireless LAN connection between the radio terminal 22 and the access point 40 is disconnected. In this example, the user who holds the radio terminal 22 has moved away from the access point 40, from which it is estimated that the strength of radio waves that the radio terminal 22 has received from the access point 40 has been reduced.

Next, the radio terminal 22 searches for an access point or a relay apparatus to which it can be connected via wireless LAN since the wireless LAN connection with the access point 40 has been disconnected (S17). The radio terminal 22 selects the access point or the relay apparatus in which the strength of radio waves that have been received is the highest from among the access points or the relay apparatuses that are present near the radio terminal 22 in Step S17. It is assumed in this example that the radio terminal 22 has selected the relay apparatus 50. In this example, the user who holds the radio terminal 22 has moved to the vicinity of the relay apparatus 50, from which it is estimated that the strength of radio waves received from the relay apparatus 50 has become higher than the strength of radio waves received from the access point 40 in the radio terminal 22.

Next, the radio terminal 22 transmits the connection request message to the relay apparatus 50 that has been selected (S18). Next, the relay apparatus 50 recognizes that the radio terminal 22 has connected thereto via wireless LAN or that the radio terminal 22 has belonged thereto (S19). The relay apparatus 50 may include, for example, a wireless LAN connection list or the like and add the radio terminal 22 which has been recognized to be connected thereto via wireless LAN to the wireless LAN connection list. Through Steps S18 and S19, the radio terminal 22 is in a condition in which it is connected to the relay apparatus 50 via wireless LAN.

As described above, by using the communication system according to the second embodiment of the present disclosure, the access point 40 is able to disconnect the wireless LAN connection with the radio terminal 22 that has moved to the vicinity of the relay apparatus 50. Since the wireless LAN connection with the access point 40 is disconnected, the radio terminal 22 is able to connect to the relay apparatus 50 located closer to the radio terminal 22 than to the access point 40.

Further, after the access point 40 receives the result of the detection indicating that a person is approaching the relay apparatus 50 from the relay apparatus 50, it is confirmed that the strength of radio waves regarding the radio terminal 22 is lower than the threshold. Accordingly, it is estimated that the user who holds the radio terminal 22 has moved away from the access point 40 and is approaching closer to the relay apparatus 50. Therefore, the access point 40 detects a situation in which the user who holds the radio terminal 22 has moved away from the access point 40 and is approaching closer to the relay apparatus 50, and disconnects the wireless LAN connection with the radio terminal 22 in order to give the radio terminal 22 an opportunity to connect to another access point or another relay apparatus.

Further, while the case in which the radio terminal 22 moves in a direction away from the access point 40 and in a direction close to the relay apparatus 50 has been described in the second embodiment of the present disclosure, the radio terminal 22 may change the connection destinations to the access point 40 in a case in which the radio terminal 22 moves in a direction away from the relay apparatus 50 and in a direction close to the access point 40. In this case, the access point 40 includes functions similar to those of the detection determination unit 53 and the sensor 54.

Third Embodiment

With reference next to FIG. 5, processing for selecting a radio terminal that disconnects wireless LAN connection in the access point 40 according to a third embodiment of the present disclosure will be explained. In FIG. 5, the respective MAC addresses, which are identification information of the relay apparatus 50, the radio terminal 22, and the radio terminal 23 connected to the access point 40 via wireless LAN, and information regarding whether each of these devices will be the target whose wireless LAN connection should be disconnected are associated with each other. The connection controller 14 of the access point 40 holds, for example, information shown in FIG. 5 in advance.

The access point 40 checks, when the radio terminal having an RSSI that is below the threshold is extracted in Step S15 in FIG. 4, whether the radio terminal that has been extracted is the target whose wireless LAN should be disconnected in FIG. 5. It is assumed, for example, that the access point 40 has extracted the relay apparatus 50, the radio terminal 22, and the radio terminal 23 as the radio terminals having RSSIs that are below the threshold. In this case, the access point 40 does not disconnect the wireless LAN connection with the relay apparatus 50 in accordance with the information managed in FIG. 5, and disconnects the wireless LAN connection with the radio terminal 22 and the radio terminal 23.

As described above, by using the information shown in FIG. 5, even when the relay apparatus and the radio terminal have the RSSIs that are below the threshold, the wireless LAN connection of a predetermined apparatus may be excluded from disconnection. For example, while the relay apparatus 50 is an apparatus that should be always connected to the access point 40 via wireless LAN, the strength of radio waves may be temporarily below the threshold due to an influence such as fading. Even in this case, only the relay apparatus 50 is able to maintain the wireless LAN connection with the access point 40.

Fourth Embodiment

Figure 6:
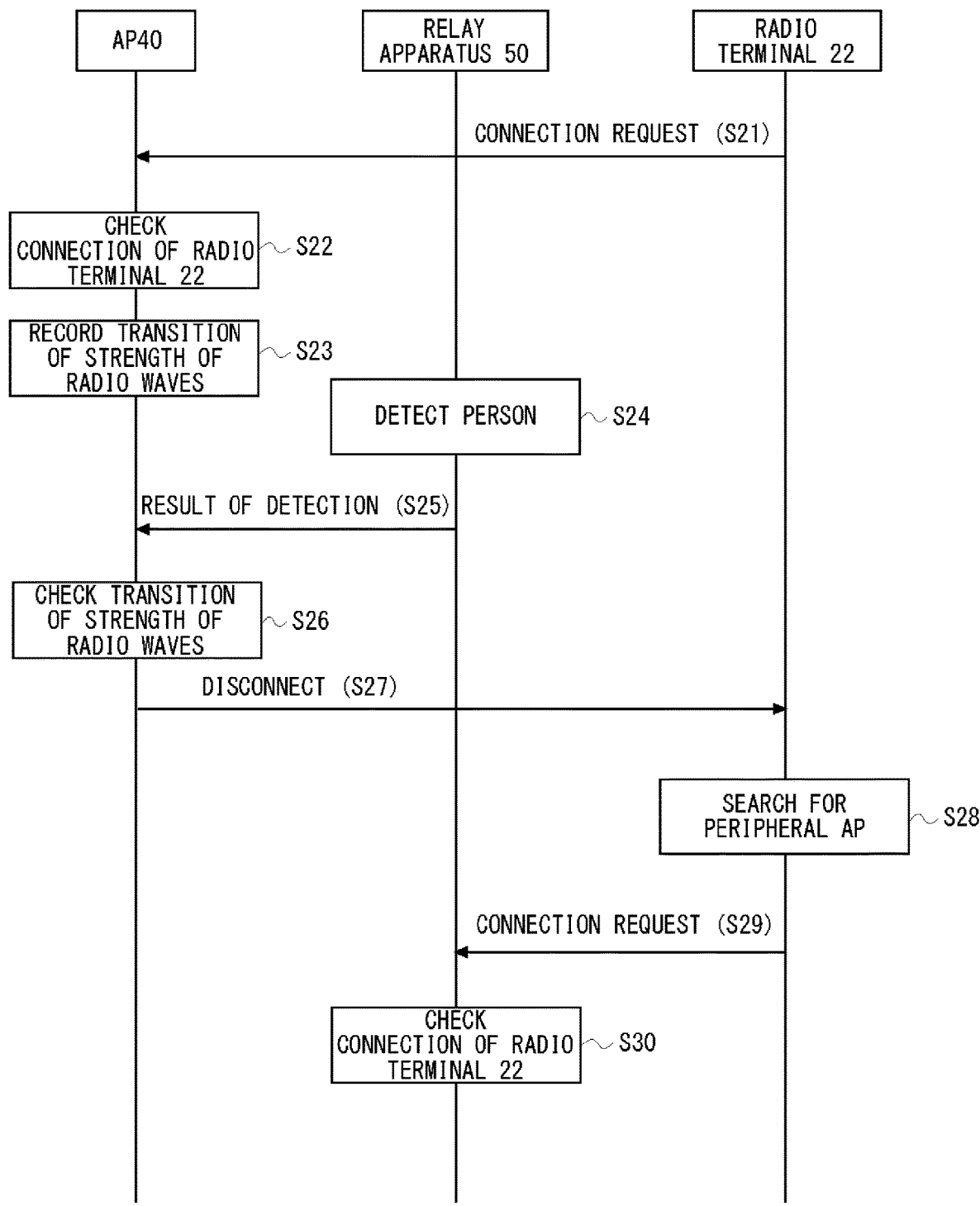
FIG. 6 is a diagram showing a flow of connection control processing of a radio terminal according to a fourth embodiment.

Reference next to FIG. 6, a flow of connection control processing of the radio terminal 22 according to a fourth embodiment of the present disclosure will be explained. Since Steps S21 and S22 are similar to Steps S11 and S12 in FIG. 4, descriptions thereof will be omitted.

When the access point 40 is connected to the radio terminal 22 via wireless LAN in Steps S21 and S22, the access point 40 regularly records the transition of the strength of radio waves received by the radio terminal 22 (S23). Further, the access point 40 records the transition of the strength of radio waves for each of all the radio terminals including the radio terminal 22 connected thereto via wireless LAN. The transition of the strength of radio waves for each radio terminal recorded by the access point 40 will be explained with reference to FIG. 7.

FIG. 7 shows the values of RSSI checked at the timings of t=0, t=5, t=10, t=15, and t=20. Note that t=5 may either mean the timing after five seconds after t=0 or mean the timing after five milliseconds after t=0. For example, the RSSI in the radio terminal 22 makes a transition from 50, 30, 10, 8, to 5 in this order. The unit of the RSSI may be, for example, mW or dBm. The transition of the RSSI of each of the radio terminals 23 and 24 is shown in a way similar to that in the radio terminal 22. FIG. 7 shows that the difference in the RSSI when t=0 and t=20 in the radio terminal 22 is the largest.

Referring once again to FIG. 6, since Steps S24 and S25 are similar to Steps S13 and S14 in FIG. 4, descriptions thereof will be omitted. When the access point 40 receives the result of detecting that a person has approached the relay apparatus 50 from the relay apparatus 50, the access point 40 checks the transition of the strength of radio waves in each of the radio terminals shown in FIG. 7 (S26). Further, in Step S26, the access point 40 selects the radio terminal whose wireless LAN connection is to be disconnected. The access point 40 may select, for example, the radio terminal in which the RSSI checked at the first timing is larger than the RSSI checked at the last timing in a predetermined period of time and the difference between the RSSI checked at the first timing and the RSSI checked at the last timing exceeds a predetermined threshold as the radio terminal whose wireless LAN connection is to be disconnected.

The transition of the strength of radio waves in each of radio terminals in FIG. 7 will be explained taking a case in which, for example, the predetermined period of time is between t=0 and t=20 and the predetermined threshold is 20 as an example. In the radio terminals 22 and 24, the RSSI when t=0 is larger than the RSSI when t=20. On the other hand, in the radio terminal 23, the RSSI when t=0 is the same as the RSSI when t=20. Further, in the radio terminal 22, the difference between the RSSI checked when t=0 and the RSSI checked when t=20 is 45, which exceeds 20, which is the threshold. On the other hand, in the radio terminal 24, the difference between the RSSI checked when t=0 and the RSSI checked when t=20 is 1, which does not exceed 20, which is the threshold.

Accordingly, in Step S26, the access point 40 selects the radio terminal 22 as the radio terminal whose wireless LAN connection should be disconnected. Since Steps S27-S30 are similar to Steps S16-S19 in FIG. 4, descriptions thereof will be omitted.

As described above, by using the communication system according to the fourth embodiment, the access point 40 is able to record the transition of the strength of radio waves for each of the radio terminals connected thereto via wireless LAN. Further, when the access point 40 receives the result of detecting that a person has approached the relay apparatus 50, the access point 40 is able to select the radio terminal whose wireless LAN connection should be disconnected using the transition of the strength of radio waves for each of the radio terminals whose strengths have been recorded.

The access point 40 selects the radio terminal whose wireless LAN connection should be disconnected using the transition of the strength of radio waves, whereby it is possible to avoid, for example, disconnection of the wireless LAN connection with the radio terminal in which the strength of radio waves has been temporarily changed due to fading or the like although this radio terminal has not made any movement.

Further, while the case in which the radio terminal 22 moves in a direction away from the access point 40 and moves in a direction close to the relay apparatus 50 has been described in the fourth embodiment of the present disclosure, the radio terminal 22 may change the connection destination to the access point 40 when the radio terminal 22 moves in a direction away from the relay apparatus 50 and moves in a direction close to the access point 40. In this case, the access point 40 has functions similar to those of the detection determination unit 53 and the sensor 54.

While the present disclosure has been described as a hardware configuration in the aforementioned embodiments, the present disclosure is not limited to this configuration. The present disclosure can achieve the processing in the radio communication apparatus that composes the communication system by causing a Central Processing Unit (CPU) to execute a computer program.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned embodiments and may be changed as appropriate without departing from the spirit of the present disclosure.

While some or all of the aforementioned embodiments may be described as shown in the following Supplementary Notes, they are not limited to them.

(Supplementary Note 1)

A radio communication apparatus comprising:

a first communication unit configured to be connected to at least one radio terminal via wireless LAN;

a second communication unit configured to be connected to another radio communication apparatus including a sensor via wireless LAN and receiving a result of a detection in the sensor indicating that a person is approaching from the other radio communication apparatus;

a monitoring unit for monitoring a radio wave condition between the first communication unit and the at least one radio terminal to which the first communication unit is connected via wireless LAN; and a connection control unit for canceling, when the result of the detection is received, wireless LAN connection with a radio terminal in which the radio wave condition is lower than a predetermined quality.

(Supplementary Note 2)

The radio communication apparatus according to Supplementary Note 1, wherein the monitoring unit monitors the value of the strength of radio waves between the first communication unit and the at least one radio terminal, and the connection control unit cancels wireless LAN connection with a radio terminal in which the value of the strength of radio waves is below a predetermined value.

(Supplementary Note 3)

The radio communication apparatus according to Supplementary Note 1, wherein the monitoring unit monitors transition of the value of the strength of radio waves between the first communication unit and the at least one radio terminal, and the connection control unit cancels wireless LAN connection with a radio terminal in which a change in the strength of radio waves within a predetermined period of time has exceeded a predetermined value.

(Supplementary Note 4)

The radio communication apparatus according to Claim 3, wherein the connection control unit cancels the wireless LAN connection with a radio terminal in which the strength of radio waves checked at the first timing is larger than the strength of radio waves checked at the last timing in the predetermined period of time and the difference between the strength of radio waves checked at the first timing and the strength of radio waves checked at the last timing exceeds a predetermined threshold.

(Supplementary Note 5)

The radio communication apparatus according to any one of Supplementary Notes 1 to 4, wherein the connection control unit holds information indicating whether the radio terminal that is performing wireless LAN connection is the target whose wireless LAN connection should be canceled, and does not cancel, when the result of the detection is received, wireless LAN connection with a radio terminal whose wireless LAN connection should not be canceled among radio terminals in which the radio wave condition is lower than a predetermined quality.

(Supplementary Note 6)

The radio communication apparatus according to any one of Supplementary Notes 1 to 5, wherein the other radio communication apparatus is a relay apparatus that relays radio communication between a radio terminal and the radio communication apparatus.

(Supplementary Note 7)

The radio communication apparatus according to any one of Supplementary Notes 1 to 5, wherein the other radio communication apparatus is an access point that performs wireless LAN communication with a radio terminal directly or performs wireless LAN communication with a radio terminal via the first communication unit and the second communication unit.

(Supplementary Note 8)

A radio communication apparatus comprising:

a sensor configured to detect that a person is approaching; and a communication unit configured to be connected, via wireless LAN, to another radio communication apparatus that is connected to at least one radio terminal via wireless LAN, and transmitting, when the sensor has detected that a person is approaching, the result of the detection in the sensor to the other radio communication apparatus in order to use the result of the detection for a determination regarding whether to maintain the wireless LAN connection with the at least one radio terminal in the other radio communication apparatus.

(Supplementary Note 9)

The radio communication apparatus according to Supplementary Note 8, wherein the sensor is one of a motion sensor and an illuminance sensor.

(Supplementary Note 10)

A radio communication system comprising:

a radio terminal configured to perform wireless LAN communication;

a first radio communication apparatus connected to the at least one radio terminal via wireless LAN; and a second radio communication apparatus that is connected to the first radio communication apparatus via wireless LAN and comprises a sensor that detects that a person is approaching, wherein the second radio communication apparatus transmits the result of the detection to the first radio communication apparatus when the sensor detects that a person is approaching, the first radio communication apparatus cancels wireless LAN connection with a radio terminal in which a radio wave condition is poorer than a predetermined quality when it receives the result of the detection, and the radio terminal whose wireless LAN connection has been canceled is connected to one of the first radio communication apparatus and the second radio communication apparatus in which the radio wave condition is higher via wireless LAN.

(Supplementary Note 11)

A connection management method comprising:

connecting to at least one radio terminal via wireless LAN;

receiving, from another radio communication apparatus comprising a sensor and performing wireless LAN connection, a result of a detection in the sensor indicating that a person is approaching;

monitoring a radio wave condition with the at least one radio terminal that is performing wireless LAN connection; and canceling, when the result of the detection is received, wireless LAN connection with a radio terminal in which the radio wave condition is lower than a predetermined quality.

(Supplementary Note 12)

A program for causing a computer to execute the following processing of:

connecting to at least one radio terminal via wireless LAN;

receiving, from another radio communication apparatus comprising a sensor and performing wireless LAN connection, a result of a detection in the sensor indicating that a person is approaching;

monitoring a radio wave condition with the at least one radio terminal that is performing wireless LAN connection; and canceling, when the result of the detection is received, wireless LAN connection with a radio terminal in which the radio wave condition is lower than a predetermined quality.

While the present disclosure has been explained above with reference to the embodiments, the present disclosure is not limited to the aforementioned embodiments. Various changes that may be understood by those skilled in the art may be made to the configurations and the details of the present disclosure within the scope of the present disclosure.

This application is based upon and claims the benefit of priority from Japanese Patent Application No. 2015-187694, filed on Sep. 25, 2015, the disclosure of which is incorporated herein in its entirety by reference.

REFERENCE SIGNS LIST

10 RADIO COMMUNICATION APPARATUS
11 COMMUNICATION UNIT
12 COMMUNICATION UNIT
13 MONITORING UNIT
14 CONNECTION CONTROLLER
20 RADIO TERMINAL
22 RADIO TERMINAL
30 RADIO COMMUNICATION APPARATUS
40 ACCESS POINT
50 RELAY APPARATUS
51 COMMUNICATION UNIT
52 COMMUNICATION UNIT
53 DETECTION DETERMINATION UNIT
54 SENSOR
61 WIRELESS LAN COMMUNICATION AREA
62 WIRELESS LAN COMMUNICATION AREA

What is claimed is:

1. A radio communication apparatus comprising hardware, including a processor and memory:
   a first communication unit implemented at least by the hardware and configured to be connected to at least one radio terminal via wireless LAN;
   a second communication unit implemented at least by the hardware and configured to be connected to another radio communication apparatus including a sensor via the wireless LAN and configured to receive a result of a detection in the sensor indicating that a person is approaching from the other radio communication apparatus;
   a monitoring unit implemented at least by the hardware and configured to monitor a radio wave condition between the first communication unit and the at least one radio terminal to which the first communication unit is connected via the wireless LAN; and
   a connection control unit implemented at least by the hardware and configured to cancel, when the result of the detection is received, the wireless LAN connection with a radio terminal in which the radio wave condition is lower than a predetermined quality.

2. The radio communication apparatus according to claim 1, wherein
   the monitoring unit monitors a value of the strength of radio waves between the first communication unit and the at least one radio terminal, and
   the connection control unit cancels the wireless LAN connection with a radio terminal in which the value of the strength of radio waves is below a predetermined value.

3. The radio communication apparatus according to claim 1, wherein
   the monitoring unit monitors transition of the value of the strength of radio waves between the first communication unit and the at least one radio terminal, and
   the connection control unit cancels the wireless LAN connection with a radio terminal in which a change in the strength of radio waves within a predetermined period of time has exceeded a predetermined value.

4. The radio communication apparatus according to claim 3, wherein the connection control unit cancels the wireless LAN connection with a radio terminal in which the strength of radio waves checked at the first timing is larger than the strength of radio waves checked at the last timing in the predetermined period of time and the difference between the strength of radio waves checked at the first timing and the strength of radio waves checked at the last timing exceeds a predetermined threshold.

5. The radio communication apparatus according to claim 1, wherein the connection control unit holds information indicating whether the radio terminal that is performing the wireless LAN connection is the target whose wireless LAN connection should be Cancelled, and does not cancel, when the result of the detection is received, the wireless LAN connection with a radio terminal whose wireless LAN connection should not be Cancelled among radio terminals in which the radio wave condition is lower than a predetermined quality.

6. The radio communication apparatus according to claim 1, wherein the other radio communication apparatus is a relay apparatus that relays radio communication between a radio terminal and the radio communication apparatus.

7. The radio communication apparatus according to claim 1, wherein the other radio communication apparatus is an access point that performs wireless LAN communication with a radio terminal directly or performs wireless LAN communication with a radio terminal via the first communication unit and the second communication unit.

8. A radio communication apparatus comprising hardware, including a processor and memory:
   a sensor implemented at least by the hardware and configured to detect that a person is approaching; and
   a communication unit implemented at least by the hardware and configured to be connected, via wireless LAN, to another radio communication apparatus that is connected to at least one radio terminal via the wireless LAN, and configured to transmit, when the sensor has detected that a person is approaching, the result of the detection in the sensor to the other radio communication apparatus in order to use the result of the detection for a determination regarding whether to maintain the wireless LAN connection with the at least one radio terminal in the other radio communication apparatus.

9. The radio communication apparatus according to claim 8, wherein the sensor is one of a motion sensor and an illuminance sensor.

10. A connection management method comprising:
- connecting a radio communication apparatus to at least one radio terminal via wireless LAN;
- receiving, by the radio communication apparatus, from another radio communication apparatus comprising a sensor and performing the wireless LAN connection, a result of a detection in the sensor indicating that a person is approaching;
- monitoring, by the radio communication apparatus, a radio wave condition with the at least one radio terminal that is performing the wireless LAN connection; and
- canceling, by the radio communication apparatus, when the result of the detection is received, the wireless LAN connection with a radio terminal in which the radio wave condition is lower than a predetermined quality.

* * * * *